United States Patent
Metz et al.

(10) Patent No.: US 9,518,476 B2
(45) Date of Patent: Dec. 13, 2016

(54) EXHAUST-GAS TURBOCHARGER

(71) Applicant: BorgWarner Inc., Auburn Hills, MI (US)

(72) Inventors: Dietmar Metz, Meckenheim (DE); Martin Mueller, Speyer (DE); Thomas Ramb, Worms (DE)

(73) Assignee: BorgWarner Inc., Auburn Hills, MI (US)

( * ) Notice: Subject to any disclaimer, the term of this patent is extended or adjusted under 35 U.S.C. 154(b) by 295 days.

(21) Appl. No.: 14/396,104

(22) PCT Filed: Apr. 19, 2013

(86) PCT No.: PCT/US2013/037290
§ 371 (c)(1),
(2) Date: Oct. 22, 2014

(87) PCT Pub. No.: WO2013/163015
PCT Pub. Date: Oct. 31, 2013

(65) Prior Publication Data
US 2015/0118028 A1 Apr. 30, 2015

(30) Foreign Application Priority Data
Apr. 27, 2012 (DE) .......... 10 2012 008 467

(51) Int. Cl.
*F01D 17/16* (2006.01)
*F02B 37/24* (2006.01)

(52) U.S. Cl.
CPC ............ *F01D 17/167* (2013.01); *F02B 37/24* (2013.01); *F05D 2220/40* (2013.01); *Y02T 10/144* (2013.01)

(58) Field of Classification Search
CPC .... F01D 17/167; F02B 37/24; F05D 2220/40; Y02T 10/144
See application file for complete search history.

(56) References Cited

U.S. PATENT DOCUMENTS

| | | | |
|---|---|---|---|
| 2006/0112690 A1* | 6/2006 | Hemer | F01D 17/165 60/602 |
| 2008/0031728 A1* | 2/2008 | Sausse | F01D 17/165 415/160 |
| 2009/0022581 A1* | 1/2009 | Tries | F01D 17/165 415/163 |
| 2009/0252601 A1* | 10/2009 | Wengert | F01D 17/165 415/163 |

(Continued)

*Primary Examiner* — Igor Kershteyn
(74) *Attorney, Agent, or Firm* — A. Michael Tucker; Stephan A. Pendorf; Patent Central LLC

(57) ABSTRACT

An exhaust-gas turbocharger (1) having a turbine (2), with a turbine wheel (3) surrounded by an intake duct (4), and a VTG cartridge (5), with a washer (6) and a vane bearing ring (7), which delimit the intake duct (4), and with a plurality of vanes (8), arranged in the intake duct (4) and mounted in the vane bearing ring (7) by way of rotatable vane shafts (9), which are connected to vane levers (10), the lever heads (11) of which engage into associated grooves (12) in a unison ring (13), which surrounds the vane bearing ring (7); and having a radial bearing between the unison ring (13) and the vane bearing ring (7). The vane levers (10) for forming the radial bearing are in the form of cam levers, the lever heads (11) of which are supported in the grooves (12).

20 Claims, 2 Drawing Sheets

(56) References Cited

U.S. PATENT DOCUMENTS

Figure 1:
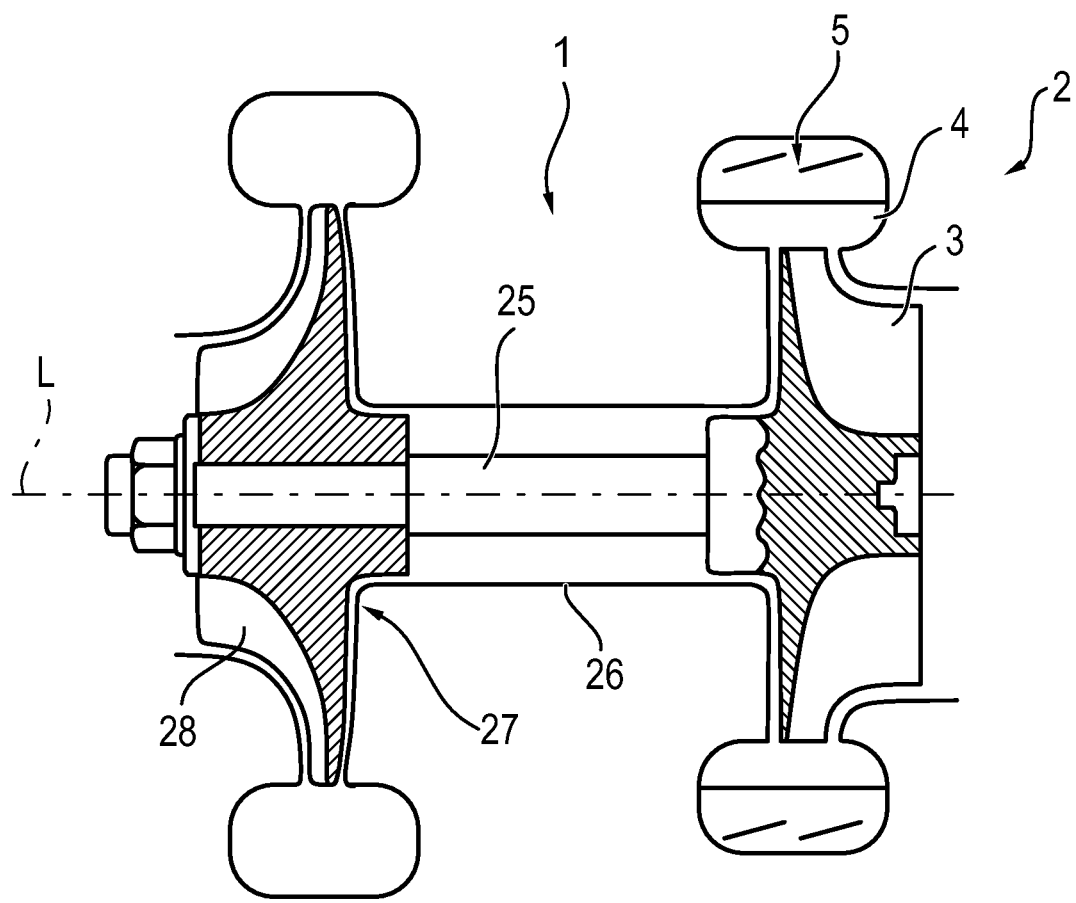

2010/0014961 A1\* 1/2010 Boning ................ F01D 17/165
 415/160
2013/0004298 A1\* 1/2013 Ramb ................... F01D 17/165
 415/148

\* cited by examiner

EXHAUST-GAS TURBOCHARGER

The invention relates to an exhaust-gas turbocharger according to the preamble of claim 1.

In the case of such an exhaust-gas turbocharger, provision is made of a variable turbine geometry (VTG), in which guide vanes are adjusted by means of a unison ring. In order to be able to provide the best possible control, the least possible hysteresis and thus the least possible friction of the system is desirable. The radial bearing of the unison ring also has an influence on this, for example. In the case of known exhaust-gas turbochargers, rollers on pins or else a rolling bearing are provided for this.

In view of this, it is an object of the present invention to provide an exhaust-gas turbocharger of the type indicated in the preamble of claim 1, the structure of which has a simpler and thus more cost-effective design.

This object is achieved by the features of claim 1.

This advantageously gives rise firstly to a saving in the number of components, for example for rollers on pins as are provided in the case of known bearings.

Furthermore, there is a reduction in production costs, since it is possible to use stamped and/or formed parts for the vane levers in the form of cam levers.

In order to make it possible to keep the bearing forces low, the force is introduced preferably in a plane as close as possible to the center of the vane shank or of the bores of the vane bearing ring, as a result of which edge loads are avoided.

The dependent claims contain advantageous developments of the invention.

Claims 11 and 12 define a VTG cartridge according to the invention as an object which can be marketed independently.

Figure 2:
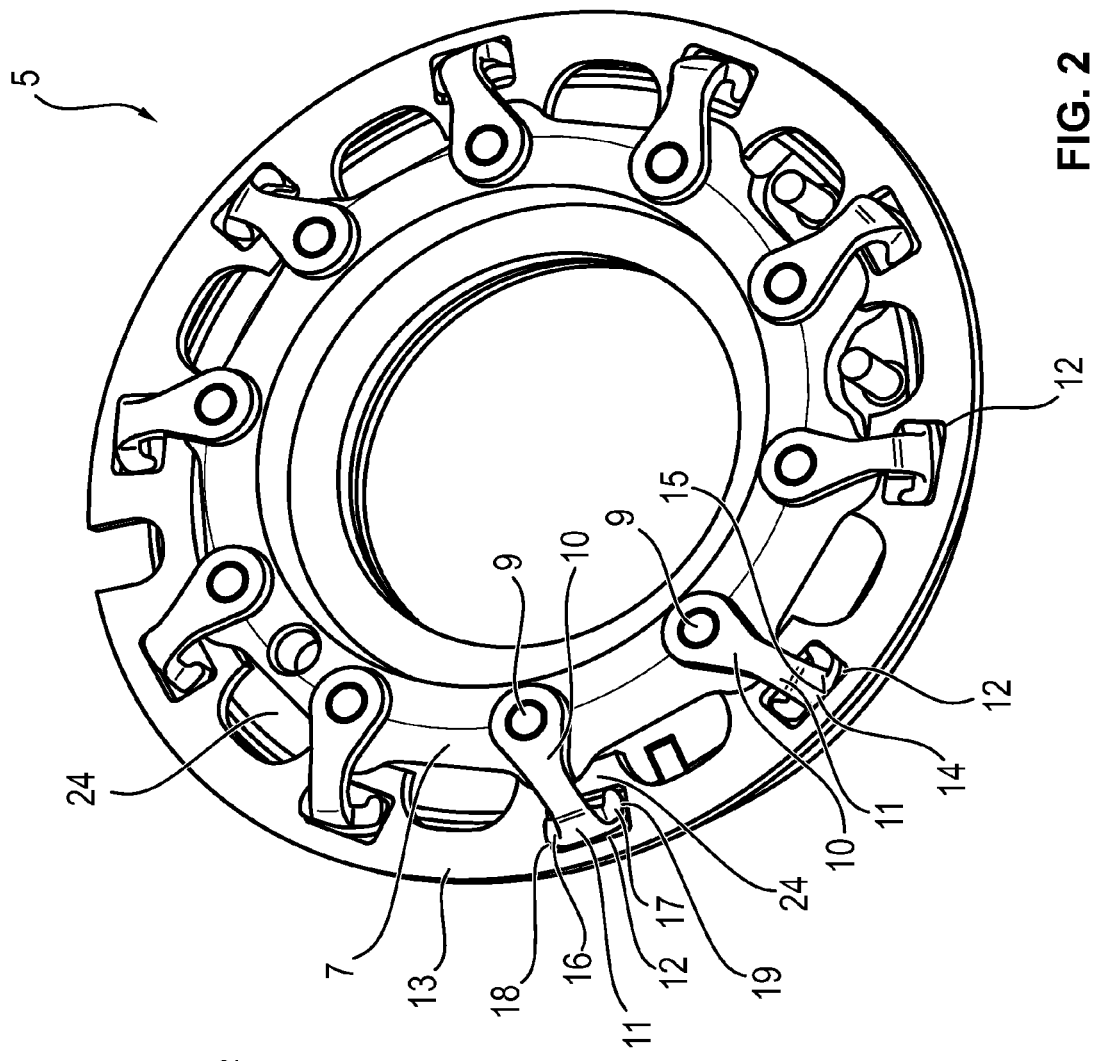
Figure 3:
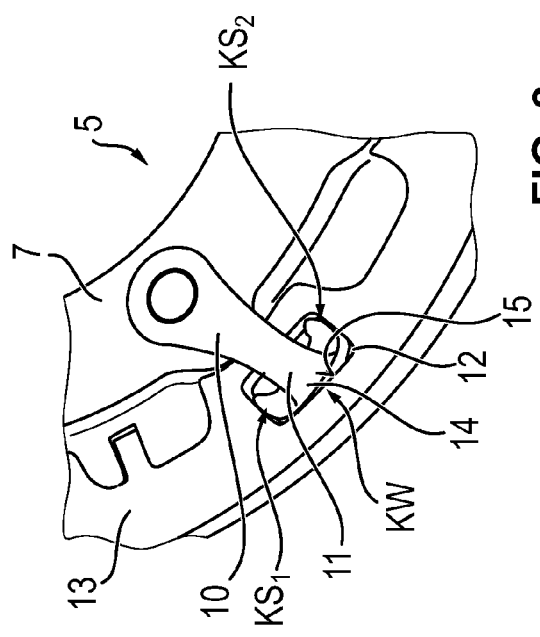
Figure 4:
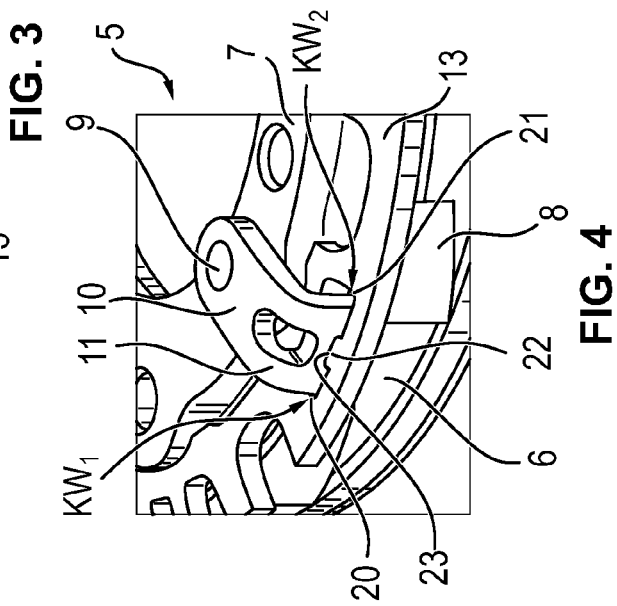

Further details, features and advantages of the invention become apparent from the following description of exemplary embodiments with reference to the drawing, in which:

FIG. 1 shows a schematically greatly simplified illustration of an exhaust-gas turbocharger according to the invention, FIG. 2 shows a perspective plan view of a first embodiment of a VTG cartridge according to the invention, FIG. 3 shows an enlarged partial view of the VTG cartridge shown in FIG. 2, and FIG. 4 shows a partial illustration, corresponding to FIG. 3, of a second embodiment of the VTG cartridge according to the invention.

FIG. 1 shows a schematically greatly simplified basic illustration of an exhaust-gas turbocharger 1 according to the invention, which has a charger axis of rotation L.

The exhaust-gas turbocharger 1 also has a turbine 2, which comprises a turbine wheel 3 surrounded by an intake duct 4, which is provided with a so-called VTG cartridge 5. This VTG cartridge 5 will be described in detail hereinbelow with reference to FIGS. 2 to 4.

The exhaust-gas turbocharger 1 also of course has all the other common parts of an exhaust-gas turbocharger, such as a rotor 25, which is mounted rotatably in a bearing housing 26 and which bears the turbine wheel 3 at one end and a compressor wheel 28 of a compressor 27 at the other end. These parts are likewise shown only in schematically greatly simplified form in FIG. 1, since they are not of importance for explaining the principles of the present invention.

The VTG cartridge, which, as mentioned, will be explained in detail hereinbelow with reference to FIGS. 2 to 4, is likewise shown in greatly schematically simplified form.

A VTG cartridge is understood to mean a structural unit which, between a vane bearing ring 7 and a washer 6, delimits an intake duct 4 for the passage of exhaust gases to the turbine wheel 3. Furthermore, a VTG cartridge of this type has a plurality of vanes, which are arranged in the intake duct 4 and of which FIG. 4 shows one vane designated 8 as a representative example of all vanes bearing the corresponding reference numeral. The vanes 8 can be moved rotatably in the vane bearing ring 7 between a closed and an open position. For this purpose, the vanes 8 have vane shafts 9 each having an axis of rotation. The vane shafts 9 in turn are connected to vane levers 10, of which two vane levers are denoted in each case in FIG. 2 with the reference numeral 10. As FIG. 2 shows, the embodiment shown there has 10 such, preferably cranked vane levers, in each case of identical design.

Each vane lever 10 has a lever head 11, which engages into an associated groove 12 in a unison ring 13. FIG. 2 shows in this respect that the unison ring 13 surrounds the vane bearing ring 7 on the outside, i.e. along the outer circumference thereof.

For radially mounting the unison ring 13, provision is made of a radial bearing, which according to the invention is formed by the vane levers 10. For this purpose, the vane levers 10 are formed as cam levers, the lever heads 11 of which are supported in the grooves 12 in the unison ring 13.

FIGS. 2 and 3 show a first embodiment in this respect. In this embodiment, the lever heads 11 are provided with end faces 14 each with a rounded form. These rounded end faces 14 are in rolling contact with a counterface 15 of the respectively associated groove 12, this rolling contact being symbolized by the arrow KW in FIG. 3.

In the embodiment shown in FIGS. 2 and 3, the counterface 15 of the grooves has a planar form in each case.

The two further arrows $KS_1$ and $KS_2$ in FIG. 3 show lateral contact points between the lever head 11 and the respectively associated groove 12. These contact points $KS_1$ and $KS_2$ arise between side walls 16 and 17 of the lever heads 11 and the corresponding associated side walls 18 and 19 of the grooves 12, these side walls 18 and 19 each adjoining the counterface 15. As shown in FIG. 2, the grooves 12 are each closed by a rear wall 24, which in turn adjoins the side walls 18 and 19 and runs substantially parallel to the counterface 15.

FIG. 4 shows a second embodiment, in which the preferably cranked vane levers 10 are in turn in the form of cam levers, the lever heads 11 of which are supported in the grooves 12, but this support being provided at lateral rolling bearing support points $KW_1$ and $KW_2$, as is evident in detail from FIG. 4. These rolling bearing support points $KW_1$ and $KW_2$ of the lever heads 11 are supported on edge regions 20, 21 of the grooves 12, as is likewise evident from FIG. 4.

Furthermore, the lever heads 11 in this embodiment each have a central recess 23, into which an associated lug 22 of the unison ring 13 engages, as a result of which the force is transmitted for adjusting the vanes.

It is common to both embodiments that the vane levers 10 are each in the form of preferably cranked levers and can be produced in the form of stamped or formed parts.

Furthermore, in both embodiments the unison ring 13 is axially mounted by way of the vane bearing ring 7. For this purpose, the vane bearing ring 7 has bearing segments 24 (see FIG. 2), which rest on the unison ring 13.

In addition to the above written disclosure, reference is hereby explicitly made to the illustrative representation of the invention in FIGS. 1 to 4 to supplement the disclosure of the invention.

LIST OF REFERENCE SIGNS

1 Exhaust-gas turbocharger
2 Turbine
3 Turbine wheel
4 Intake duct
5 VTG cartridge
6 Washer
7 Vane bearing ring
8 Vanes
9 Vane shafts
10 Vane lever
11 Lever heads
12 Grooves
13 Unison ring
14 Rounded end faces
15 Counterface
16, 17 Side walls
18, 19 Side walls
20, 21 Edge regions
22 Lug
23 Recess
24 Bearing segment
$KS_1$ and $KS_2$ Lateral contact points for adjusting the vanes
KW Contact point for rolling bearing
$KW_1$ and $KW_2$ Contact points for rolling bearing
L Charger longitudinal axis

The invention claimed is:

1. An exhaust-gas turbocharger (1) having
a turbine (2), which has
 a turbine wheel (3) surrounded by an intake duct (4), a VTG cartridge (5), which has
 a washer (6) and a vane bearing ring (7), which delimit the intake duct (4), and
 a plurality of vanes (8), which are arranged in the intake duct (4) and are mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside; and
a radial bearing between the unison ring (13) and the vane bearing ring (7), wherein
the vane levers (10) for forming the radial bearing are in the form of cam levers, the lever heads (11) of which are supported in the grooves (12).

2. The exhaust-gas turbocharger as claimed in claim 1, wherein the lever heads (11) each have a rounded end face (14), which is in rolling contact (KW) with a counterface (15) of the grooves (12).

3. The exhaust-gas turbocharger as claimed in claim 2, wherein the counterface (15) has a planar form.

4. The exhaust-gas turbocharger as claimed in claim 1, wherein the lever heads (11) have side walls (16, 17), which are in lateral contact ($KS_1$, $KS_2$) with associated side walls (18, 19) of the grooves (12) adjoining the counterface (15).

5. The exhaust-gas turbocharger as claimed in claim 1, wherein the lever heads (11) have lateral rolling bearing support points ($KW_1$, $KW_2$), which are supported on associated outer edge regions (20, 21) of the grooves (12).

6. The exhaust-gas turbocharger as claimed in claim 5, wherein the lever heads (11) each have a central recess (23), into which an associated lug (22) of the unison ring (13) engages.

7. The exhaust-gas turbocharger as claimed in claim 1, wherein the vane levers (10) are in the form of cranked levers.

8. The exhaust-gas turbocharger as claimed in claim 1, wherein the vane levers (10) are stamped or formed parts.

9. The exhaust-gas turbocharger as claimed in claim 1, wherein the unison ring (13) is axially mounted by way of the vane bearing ring (7).

10. The exhaust-gas turbocharger as claimed in claim 9, wherein the vane bearing ring (7) has bearing segments (24), which rest on the unison ring (13).

11. A VTG cartridge (5) of an exhaust-gas turbocharger (1), having
a washer (6) and having a vane bearing ring (7), which delimit an intake duct (4),
a plurality of vanes (8), which are arranged in the intake duct (4) and are mounted in the vane bearing ring (7) by way of rotatable vane shafts (9), which are connected to vane levers (10), the lever heads (11) of which engage into associated grooves (12) in a unison ring (13), which surrounds the vane bearing ring (7) on the outside, and
a radial bearing between the unison ring (13) and the vane bearing ring (7),
wherein
the vane levers (10) for forming the radial bearing are in the form of cam levers, the lever heads (11) of which are supported in the grooves (12).

12. The VTG cartridge as claimed in claim 11, wherein the lever heads (11) each have a rounded end face (14), which is in rolling contact (KW) with a counterface (15) of the grooves (12).

13. The VTG cartridge as claimed in claim 12, wherein the counterface (15) has a planar form.

14. The VTG cartridge as claimed in claim 11, wherein the lever heads (11) have side walls (16, 17), which are in lateral contact ($KS_1$, $KS_2$) with associated side walls (18, 19) of the grooves (12) adjoining the counterface (15).

15. The VTG cartridge as claimed in claim 11, wherein the lever heads (11) have lateral rolling bearing support points ($KW_1$, $KW_2$), which are supported on associated outer edge regions (20, 21) of the grooves (12).

16. The VTG cartridge as claimed in claim 15, wherein the lever heads (11) each have a central recess (23), into which an associated lug (22) of the unison ring (13) engages.

17. The VTG cartridge as claimed in claim 11, wherein the vane levers (10) are in the form of cranked levers.

18. The VTG cartridge as claimed in claim 11, wherein the vane levers (10) are stamped or formed parts.

19. The VTG cartridge as claimed in claim 11, wherein the unison ring (13) is axially mounted by way of the vane bearing ring (7).

20. The VTG cartridge as claimed in claim 19, wherein the vane bearing ring (7) has bearing segments (24), which rest on the unison ring (13).

* * * * *